United States Patent [19]

McBride

[11] Patent Number: 5,765,194
[45] Date of Patent: Jun. 9, 1998

[54] TIMING CONSISTENT DYNAMIC COMPARE WITH FORCE MISS CIRCUIT

[75] Inventor: John G. McBride, Fort Collins, Colo.

[73] Assignee: Hewlett-Packard Company, Palo Alto, Calif.

[21] Appl. No.: 641,655

[22] Filed: May 1, 1996

[51] Int. Cl.$^6$ ............................. G06F 9/28; G06F 9/26
[52] U.S. Cl. ..................... 711/138; 711/150; 711/151; 711/139; 711/167; 711/168
[58] Field of Search ........................... 395/465, 417, 395/462, 427, 445, 466; 365/49; 711/150, 151, 138, 118, 139, 205, 168, 167

[56] References Cited

U.S. PATENT DOCUMENTS

| | | | |
|---|---|---|---|
| 4,357,656 | 11/1982 | Saltz et al. | 395/465 |
| 5,237,671 | 8/1993 | Freitas et al. | 395/417 |
| 5,325,507 | 6/1994 | Freitas et al. | 365/49 |
| 5,553,264 | 9/1996 | Ozveren et al. | 395/462 |
| 5,636,363 | 6/1997 | Bourekas et al. | 395/465 |

FOREIGN PATENT DOCUMENTS

0407052A2  1/1991  European Pat. Off. .

*Primary Examiner*—Eddie P. Chan
*Assistant Examiner*—Than V. Nguyen

[57] ABSTRACT

A dynamic tag match circuit (10) has exclusive-OR gates (18) each of which receives one bit of an address signal (A) from cache tag RAM, an inverted bit of the address signal (NA) from the cache tag RAM, and one bit of an address signal (B) from an address translator. The exclusive-OR gates (18) are in parallel to each other and output a hit signal which is low only when a match occurs between the two address signals. Additionally, the hit signal is low only when the results of a force miss circuit (14) indicate that a force miss should not occur. The dynamic tag match circuit (10) further has a pull-up circuit (16) for precharging the output of the circuit (16) and for holding the output of the circuit (16) at one of the two logical levels. The force miss circuit (14) advantageously incorporates logic which coordinates the timing of the force miss evaluation with the arrival of the address (A) from the cache tag RAM. As a result, the timing of the circuit (10) is consistent regardless of where a miss originates, whether it be from the address compare circuit (12) or the force miss circuit (14). The consistency in timing simplifies the evaluation and characterization of any chip or circuit incorporating the dynamic compare circuit (10), increases the overall speed of the circuit (10), and simplifies the design of the circuits generating the force miss input signals as well as circuits downstream of the tag match circuit (10).

9 Claims, 3 Drawing Sheets

TIMING CONSISTENT DYNAMIC COMPARE WITH FORCE MISS CIRCUIT

BACKGROUND OF THE INVENTION

Field of the Invention

The present invention generally relates to a compare circuit and, more particularly, to a tag compare circuit for use in a cache to coordinate the timing between an address compare miss with a force miss.

Description of the Prior Art

In general, cache memory is a high-speed intermediate storage buffer which contains recently accessed instructions and data. When reading contents out of the cache, a tag compare circuit compares an address from a cache tag RAM with an address received from an address translator, or other address from the CPU, to determine whether the addresses match. If a match occurs, an instruction retrieved in parallel to the address from the address translator, or other address, is determined to be valid and may be processed. If a match between the addresses does not occur, on the other hand, then a miss has occurred and the retrieved instruction is found to be invalid. The comparison between addresses must be performed at a very high speed in order that the cache operate as a high-speed storage buffer.

At times, it is desirable to force a miss in the tag compare circuit. In other words, even though the results of the tag compare circuit may indicate that the address from the cache tag RAM is the same as the address from the address translator, a miss should nonetheless be found so that the retrieved instruction would be found to be invalid. As examples, a force miss may be desirable when the cache is disabled, when accessing the Input/Output space, or when writing to the cache. These are just examples of when a force miss may be desired and other examples will be apparent to those skilled in the art.

One manner in which force miss circuitry may be added to a tag compare circuit is by adding some additional logic circuitry external to the compare itself. For instance, an output from the tag compare circuit may be input to an OR gate along with a force miss signal. If either of the two inputs to the OR gate go high, the circuit indicates that a miss has occurred. Alternatively, if both the output from the tag compare circuit and the force miss signal are low, then the circuit indicates that a hit occurred and processing may proceed with the retrieved instruction.

A disadvantage to this additional logic circuitry, however, is that an additional delay is introduced. The additional delay reduces the speed of the circuit thereby reducing the speed of the processor. The additional delay also causes the results from the tag compare circuit to be available at a different time than the results from the force miss circuit. The delay between results affects circuits downstream of the dynamic tag compare by requiring that these downstream circuits handle the differences in delays between the two sets of results. The additional logic circuitry therefore introduces a delay which reduces the speed of the overall processor and complicates circuitry downstream of the tag compare circuit.

Another disadvantage in this additional logic circuitry is that the differences in timing between the two sets of results complicates the characterization and evaluation of a chip incorporating the tag compare circuit. The evaluation of the compare circuit is complicated since the performance of the chip differs depending upon where the miss originates, whether it comes from the tag compare circuit or from the force miss circuit. The characterization is complicated since the chip may operate in one manner with a miss from the tag compare circuit and in another manner with a miss from the force miss circuit, whereby the chip operates differently based on different inputs. The characterization is also complicated since the difference in timing causes the task of tracing down speed paths to be more difficult. Thus, the additional logic circuitry, in addition to introducing delays, also complicates the evaluation and characterization of a chip containing the dynamic compare circuitry.

As an alternative to the additional logic circuitry, the dynamic compare circuitry may be altered to generate the force miss signals at an earlier time, whereby the results of the force miss would occur prior to the results of the tag compare circuit. This alternative, however, is not easily accomplished, or perhaps even impractical, and would require redesigning the logic circuitry that generates the force miss signals to be earlier and be held the same. It would therefore be difficult to generate the results of the force miss circuit prior to the results of the tag compare circuit.

SUMMARY OF THE INVENTION

An object of the present invention is to provide a dynamic compare circuit which can provide the results of a force miss at a timing consistent with the results from an address compare.

Another object of the present invention is to provide a dynamic compare circuit which quickly provides the results from a force miss circuit.

Another object of the present invention is to provide a dynamic compare circuit which simplifies the characterization of a chip containing the dynamic compare circuit.

Another object of the present invention is to provide a dynamic compare circuit which simplifies the evaluation of a chip containing the dynamic compare circuit.

Another object of the present invention is to simplify the design of the input force miss signals and circuits downstream of the compare circuit.

Additional objects, advantages, and novel features of the invention will be set forth in the description which follows, and will become apparent to those skilled in the art upon reading this description or practicing the invention.

To achieve the foregoing and other objects, a dynamic compare circuit according to a preferred embodiment of the invention comprises an address compare circuit for receiving a first address signal and a second address signal and for outputting an address miss signal when the first address signal is unequal to the second address signal. The first address signal is a dynamic signal while the second address signal, in the preferred embodiment, is a static signal. The dynamic compare circuit further includes a force miss circuit for outputting a force miss signal upon receipt of at least one force-miss input signal. The force-miss input signal forces a miss between the first and second address signals regardless of whether the two address signals are unequal to each other. The force miss circuit outputs its force miss signal at a time synchronized to when the address compare circuit outputs its address miss signal so that the force miss circuit and the address compare circuit generate their respective outputs simultaneously to each other.

With the invention, since the force miss output signal is generated simultaneously with the address compare signal, the dynamic compare circuit produces a timing consistent circuit which simplifies the design of circuitry both downstream and upstream of the tag compare circuit. Since the timing is consistent, the characterization and evaluation of any chip containing the tag compare circuit is significantly simplified. Also, the invention produces the force miss signal in a manner which does not require the introduction of additional delays.

BRIEF DESCRIPTION OF THE DRAWINGS

The accompanying drawings, which are incorporated in, and form a part of, the specification, illustrate a preferred embodiment of the present invention and, together with the description, serve to explain the principles of the invention. The drawings are not necessarily to scale, emphasis instead being placed upon clearly illustrating the principles of the invention. In the drawings.

DETAILED DESCRIPTION OF THE PREFERRED EMBODIMENT

Figure 1:
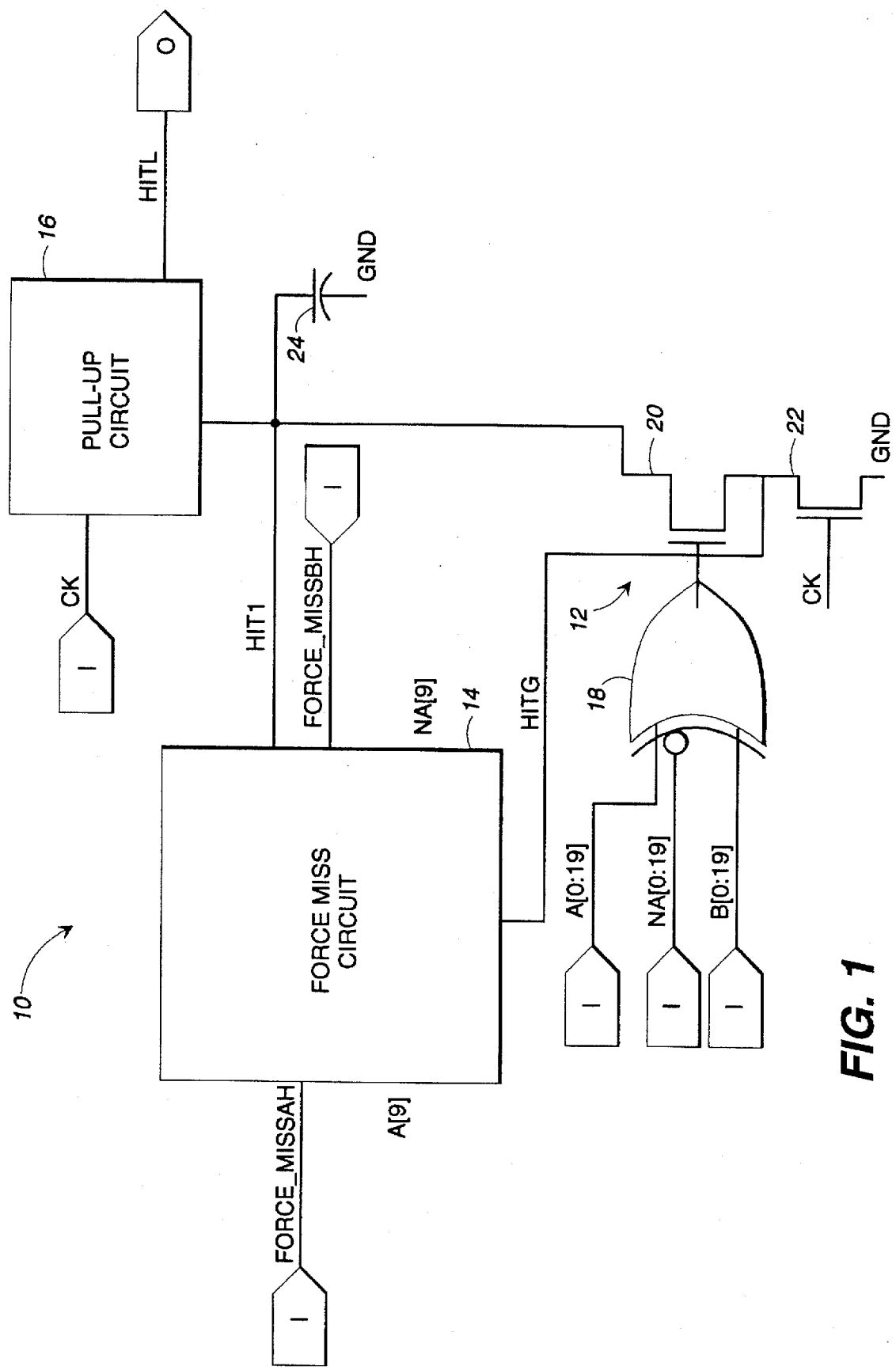
FIG. 1 is a schematic diagram of a dynamic tag match circuit according to a preferred embodiment of the invention.

Reference will now be made in detail to the preferred embodiment of the invention. With reference to FIG. 1, a dynamic tag match circuit 10 according to a preferred embodiment comprises an address compare circuit 12, a force miss circuit 14, and a pull-up circuit 16. The tag compare circuit 10 is preferably employed in conjunction with cache memory and, more precisely, with a PA-7300LC microprocessor manufactured by Hewlett-Packard. It should be understood, however, that the tag match circuit 10 may be employed in other cache memories or even in other types of circuits.

The address compare circuit 12 determines whether an address signal A generated by a cache tag RAM is unequal to an address signal B generated by an address translator. The cache tag RAM and the address translator are well known devices and have accordingly been omitted from the drawings in order to simplify the description of the invention. If the address signals A and B differ, the address compare circuit 12 generates a miss signal.

The force miss circuit 14 generates a force miss output signal upon receipt of any one force miss input signal, such as force miss signal AH and force miss signal BH, and upon the occurrence of another event. Upon receipt of either force miss signal AH or force miss signal BH and the occurrence of the other event, the force miss circuit 14 generates a force miss output signal. As will be more apparent from the description below, the force miss output signal forces the tag match circuit 10 to operate as if a miss occurred between the two address signals A and B regardless of whether the two address signals are unequal to each other. The force miss signal AH and the force miss signal BH are generated by conventional circuitry which has been omitted to simplify the description of the invention.

The other event for enabling the force miss circuit 14 to generate a force miss output signal is the receipt of at least one bit of the address signal A from the cache tag RAM. In the example shown in FIG. 1, the force miss circuit 14 receives the ninth bit of both the address signal A and the ninth bit of an address signal NA. The address signal NA is an inverted form of the address signal A during an evaluation phase of operation for the tag match circuit 10 and is held low with the address signal A during a precharge phase of operation. It should be understood that the force miss circuit 14 could alternatively receive other bits of the address signals A and NA and that the ninth bit was chosen because the bit was conveniently located in the near proximity of the tag match circuit 10.

Prior to the generation of a miss signal by either the address compare circuit 12 or the force miss circuit 14, the pull-up circuit 16 receives a clock signal CK and precharges a capacitor 24 to a potential, thereby placing a signal line HIT1 at a logical value of one. The capacitor 24 preferably represents just the capacitive component of the signal line HIT1 but may additionally or alternatively comprise a discrete capacitive element or the capacitive component of the field effect transistors connected to the signal line HIT1.

The address compare circuit 12, as shown in more detail in FIG. 1, includes a plurality of exclusive-OR gates 18 and transistors 20, only one pair of which is shown. Each exclusive-OR gate 18 receives one bit of the address signal A from the cache tag RAM, the same one bit of the address signal NA, and the same one bit of the address signal B from the address translator. The exclusive-OR gates 18 operate so as to output a high signal only when address signal A is high and B is low or when address signal NA is high and address signal B is high. In such situations, the address signals A and B are unequal to each other and the transistor 20 associated with the unequal addresses receives a high signal at its gate to thereby become conductive. After the transistor 20 becomes conductive, the precharged capacitor 24 becomes discharged and the potential on the line HIT1 drops down to ground.

Thus, when any one of the bits in the address signals A and B differ from each other, the output from that respective exclusive-OR gate 18 turns the associated transistor 20 on so as to discharge the capacitor 24 and to thereby indicate that a miss has occurred. If, on the other hand, all bits of the address signals A and B are equal to each other, then the output of each exclusive-OR gate 18 will be a low signal and none of the transistors 20 will become conductive. Since the transistors 20 are not turned on when the address signals A and B are equal to each other, the potential on the line HIT1 is not discharged but rather remains high to indicate that a hit has occurred.

The tag match circuit 10 further includes a transistor 22 having a gate connected to the clock signal CK, a drain connected to the sources of the transistors 20, and a source connected to ground. The transistor 22 is not conductive when the clock signal is low, which corresponds: to when the pull-up circuit 16 precharges the line HIT1. As a result, during the precharge phase of operation for the tag match circuit 10, the HIT1 line cannot be connected to ground by the address compare circuit 12. When the clock signal CK goes high thereby placing the tag match circuit 10 in the evaluation phase of operation, however, the transistor 22 connects the sources of the transistors 20 to ground, whereby the address compare circuit 12 can discharge the potential on the line HIT1 if the addresses A and B do not match each other.

Figure 2A:
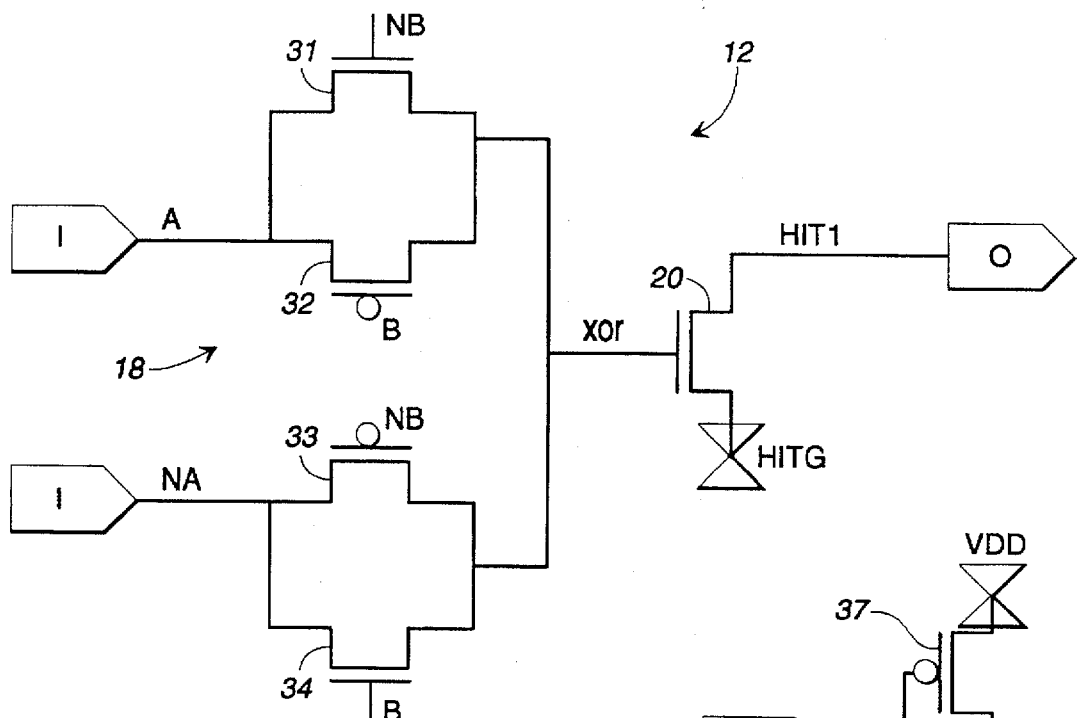
FIG. 2(A) is a circuit schematic of an exclusive-OR gate and pull-down transistor shown in the diagram of FIG. 1.

With reference to FIG. 2(A), the exclusive-OR gate 18 comprises a first pair of MOSFET transistors 31 and 32 having their sources and drains connected to each other and a second pair of MOSFET transistors 33 and 34 having their sources and drains connected to each other. The first pair of MOSFET transistors 31 and 32 receive one bit of the address signal A at their drains while the second pair of MOSFET transistors 33 and 34 receive the same one bit of the inverted address signal NA. The gate of MOSFET transistor 31 receives the same one bit of an address signal NB, which is the address signal B inverted, and MOSFET transistor 32 has an inverter at its gate for receiving the bit from address signal B. With regard to the other pair of MOSFET transistors 33 and 34, MOSFET transistor 33 has an inverter at its gate for receiving the bit from address signal NB and MOSFET transistor 34 receives the bit from address signal B at its gate.

During the evaluation phase of operation, only one pair of MOSFET transistors 31 and 32 or 33 and 34 will be conductive. More precisely, when the bit of address signal B is high, then MOSFET transistors 33 and 34 are conductive and when the bit of address signal B is low, then MOSFET transistors 31 and 32 are conductive. Also, only one of the bits from address signal A or from address signal NA will be high.

Thus, when both bits from address signals A and B are low, MOSFET transistors 31 and 32 are conductive and act to pass through the low value from the address signal A to the gate of transistor 20. If, on the other hand, both bits from address signals A and B are high, then MOSFET transistors 33 and 34 are conductive and act to pass through the low value from address signal NA to the gate of transistor. Consequently, when the bits from address signals A and B are equal to each other, the output of the exclusive-OR gate 18 remains low, the transistor 20 remains non-conductive, and the capacitor 24 continues to be precharged with the potential. In contrast, when the bits from address signals A and B differ, the one pair of MOSFET transistors 31 and 32 or 33 and 34 which is conductive will pass through a high value from either address signal A or NA so as to turn on transistor 20 and discharge the capacitor 24, thereby indicating that a miss has occurred.

Figure 2B:
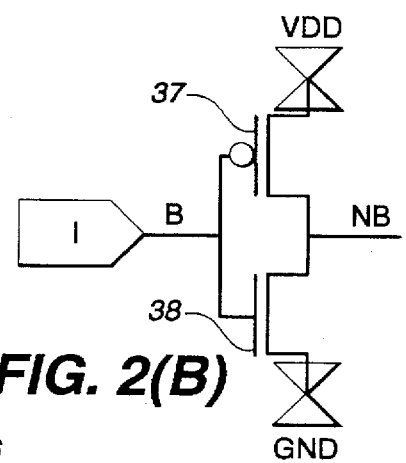
FIG. 2 (B) is a circuit schematic of an inverter for use in the dynamic tag match circuit of FIG. 1.

A circuit for inverting the address signal B into the address signal NB is shown in FIG. 2(B) and comprises a pair of MOSFET transistors 37 and 38. The MOSFET transistor 37 has its source connected to a voltage source VDD, its drain connected to the drain of MOSFET transistor 38, and has an inverter at its gate which is connected to the gate of MOSFET transistor 38 and also to the address; signal B. The MOSFET transistor 37 has been illustrated with an inverter at its gate according to the standard practice of illustrating PFET's. The source of MOSFET transistor 38 is connected to ground GND and the common connected between its drain and the source of MOSFET transistor 37 produces the address signal NB. The circuit in FIG. 2(B) operates in a well known manner by causing MOSFET transistor 38 to conduct and tie the address signal NB to ground when the address signal B is high and by causing MOSFET transistor 37 to conduct and tie the address signal NB to the voltage source VDD when the address signal B is low.

Figure 3:
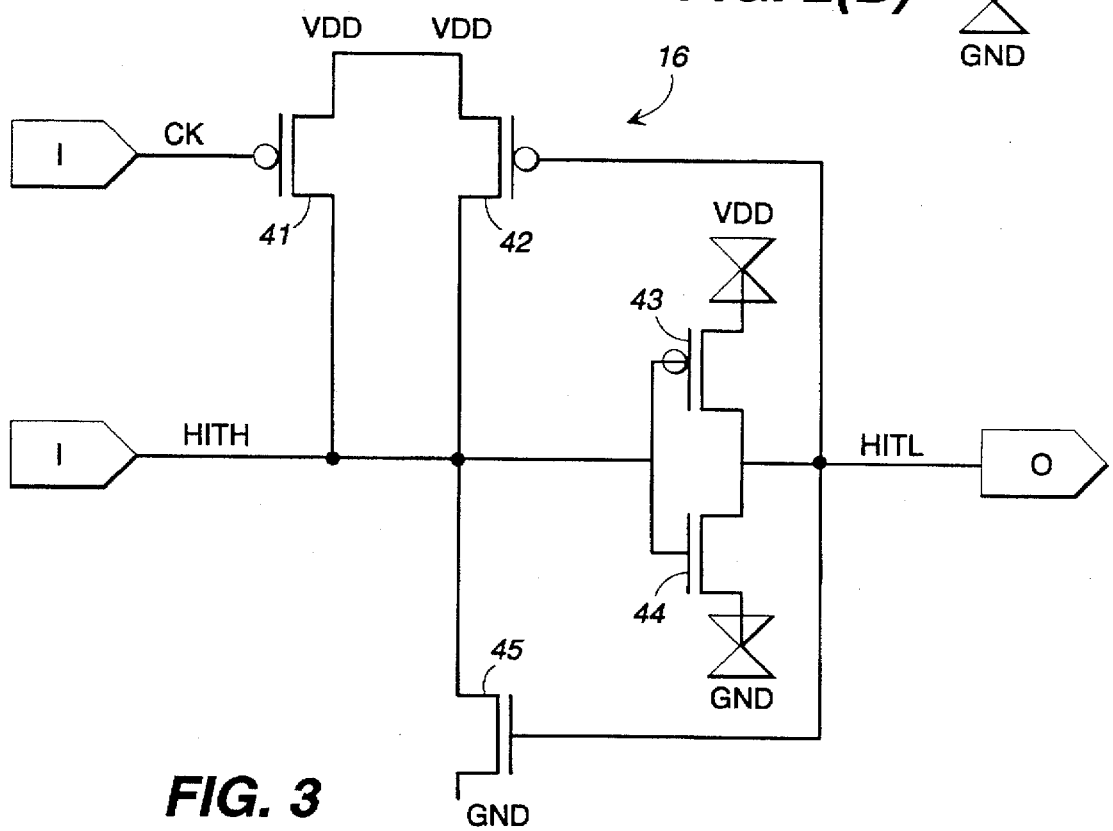
FIG. 3 is a circuit schematic of a pull-up circuit shown in the diagram of FIG. 1.

A more detailed schematic of the pull-up circuit 16 is shown in FIG. 3 and comprises a pair of MOSFET transistors 43 and 44 for inverting the signal on the HIT1 line. In the example shown, when a hit occurs in the tag compare circuit 10, the HIT1 line is high HITH and, after passing through inverting MOSFET transistors 43 and 44, becomes low HITL. The pull-up circuit 16 also includes a PFET transistor 41 for receiving the clock signal CK at its gate and for precharging the capacitor 24, and thus the line HIT1, during the low phase portion of the clock signal CK.

The circuit 16 further includes a MOSFET transistor 42 for holding or latching the potential on the line HIT1. The circuit 16 preferably holds the potential on the line HIT1 since some leakage may occur through the force miss circuit 14 or through the transistor 20. When the signal on line HIT1 is high, the transistor 42 becomes conductive so as to tie the signal to the voltage source VDD. On the other hand, when the signal on line HIT1 is low, the circuit 16 has a MOSFET transistor 45 for tying the low level signal to ground GND.

Figure 4:
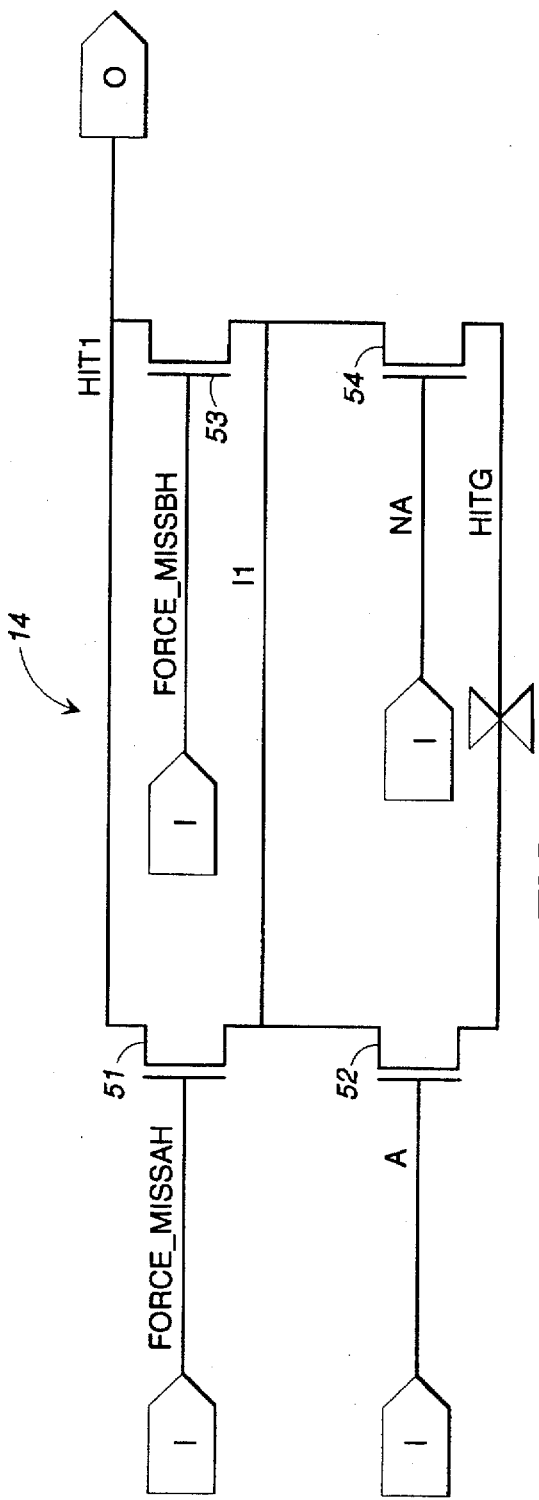
FIG. 4 is a circuit schematic of a force miss circuit shown in the diagram of FIG. 1.

With reference to FIG. 4, the force miss circuit 16 comprises MOSFET transistors 51 to 54. The MOSFET transistors 51 and 53 receive force miss signals AH and BH at their gates, respectively, have their sources connected to each other, and have their drains connected to each other. The drains of transistors 51 and 53 are also tied to the line HIT1. The MOSFET transistors 52 and 54 receive one bit of address signals A and NA at their gates, respectively, have their sources connected to each other, and have their drains connected to each other. The MOSFET transistors 52 and 54 have their drains connected to the sources of MOSFET transistors 51 and 53 thereby defining line I1 and have their sources connected to line HITG which, as shown in FIG. 1, is connected to transistor 22 and thus to ground GND while the clock signal CK is high.

The force miss circuit 16 operates such that when neither of the force miss signals AH nor BH arrives, MOSFET transistors 51 and 53 do not conduct and the potential on line HIT1 is not affected by the force miss circuit 16. On the other hand, when either one, or even both, of the transistors 51 or 53 becomes conductive, one or both of the transistors 51 or 53 becomes conductive and line HIT1 is tied to the intermediate line I1. Once the address signals A and NA arrive, one of the two transistors 52 or 54 becomes conductive so as to enable the capacitor 24 to become discharged to ground by a current path through the force miss circuit 16 and transistor 22.

Figure 5:
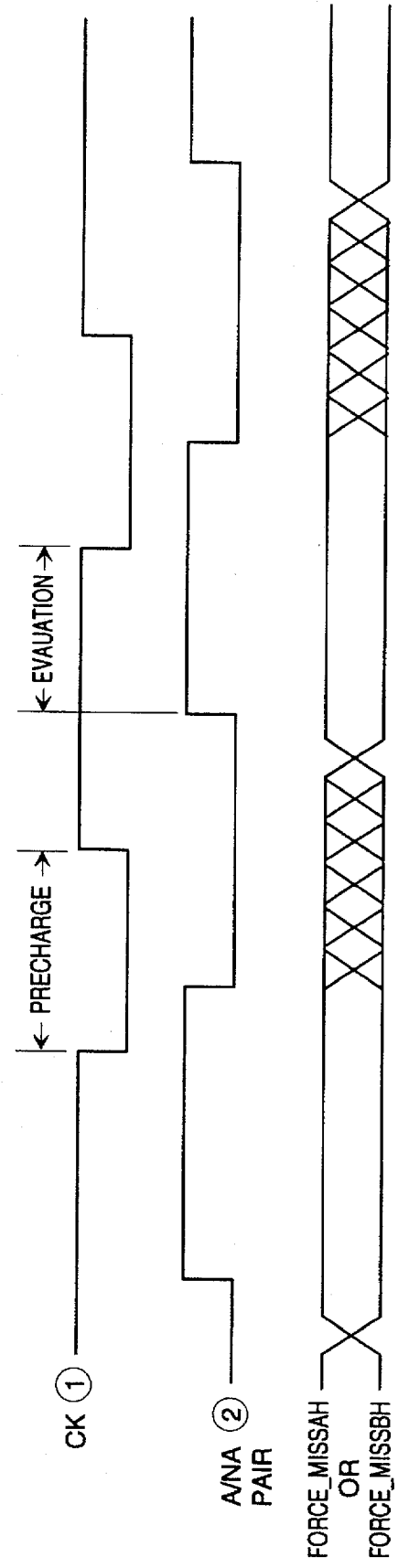
FIG. 5 is a timing diagram illustrating the operation of the dynamic tag match circuit of FIG. 1.

The operation of the entire dynamic tag match circuit 10 will now be summarized with reference to FIGS. 1 to 4 and additionally to a timing diagram shown in FIG. 5. During the precharge phase of operation while the clock signal CK is low, MOSFET transistor 41 in the pull-up circuit 16 precharges the capacitor 24 to essentially the potential of VDD. Next, the evaluation phase performed by the address compare circuit 12 and the force miss circuit 14 occurs afterwards while the clock is high. The timing of the evaluation is based more precisely on the arrival of the dynamic address signals A and NA, which are held low during the precharge. The address signal B and the force miss signals AH and BH are static signals and must be stable prior to the arrival of the address signals A and NA and until the clock signal CK goes low.

Based on the results of the address compare circuit 12 and the force miss circuit 14, the potential on the capacitor 24 and on the line HIT1 either remains high to indicate a hit or is discharged to ground to indicate a miss, whether the miss is an address miss or a force miss. The potential on the line HIT1 is inverted by the pull-up circuit 16 and is output on line HITL.

Advantageously, because the force miss circuit 16 receives at least one bit from the address signal A, the force miss circuit 14 outputs its results at the same time that the address compare circuit 12 outputs its results. This consistent timing between a force miss and an address miss greatly simplifies the characterization and evaluation of any chip or circuit containing the tag match circuit 10.

With the invention, the output of the address compare circuit 12 is not gated together with a force miss signal as was done in previous cache memories. Rather, the force miss circuit 14 eliminates this additional gate and consequently eliminates the delay associated with the gate. Since the force miss circuit 14 produces its output at the same time as the address compare circuit, the design of circuits downstream of the tag match circuit 10 are not affected by any delay between the different types of misses, namely a force miss and an address miss. The cache memories containing the tag match circuit 10 can also operate at higher speeds since the force miss output signals are not delayed relative to the address miss signals.

The foregoing description of the preferred embodiment of the invention has been presented for purposes of illustration and description. It is not intended to be exhaustive or to limit the invention to the precise form disclosed. Many modifications and variations are possible in light of the above teaching.

For instance, while the invention has preferably been implemented with MOSFET transistors, the tag match circuit may alternatively be implemented in another type of technology. Also, although the force miss circuit 16 has been described as receiving both the force miss signal AH and the force miss signal BH, the force miss circuit 14 may receive a greater or lesser number of force miss input signals.

The embodiment was chosen and described in order to explain the principles of the invention and their practical application to thereby enable others skilled in the art to utilize the invention and various embodiments and with various modifications as are best suited to the particular use contemplated. It is intended that the scope of the invention be defined by the claims.

Wherefore, the following is claimed:

1. A dynamic tag match circuit, comprising:
    an address compare circuit for receiving a first address signal and a second address signal and for producing an address miss signal as an output of the address compare circuit when said first address signal is unequal to said second address signal, the address miss signal being output from said dynamic tag match circuit, wherein a first timing interval of a predetermined duration occurs between an instant in time at which the address compare circuit receives the first and second address signals and an instant in time at which the address miss signal is output from the dynamic tag match circuit; and
    a force miss circuit for producing a force miss output signal as an output of said force miss circuit upon receipt of at least one force-miss input signal, said force-miss input signal the force miss output signal being output from said dynamic tag match circuit regardless of whether said first address signal is unequal to said second address signal, wherein a timing interval having a duration which is substantially equal to the duration of said first timing interval occurs between an instant in time at which the address compare circuit receives the first and second address signals and an instant in time at which the force miss output signal is output from the dynamic tag match circuit.

2. The dynamic tag match circuit as set forth in claim 1, wherein said first address signal is a cache tag RAM address signal.

3. The dynamic tag match circuit as set forth in claim 1, wherein said second address signal is an address translator address signal.

4. The dynamic tag match circuit as set forth in claim 1, wherein said address compare circuit comprises an exclusive-OR gate for each bit of the first and second address signals, each exclusive-OR gate receiving a respective bit of the first address signal, an inverted respective bit of the first address signal, and a respective bit of the second address signal.

5. The dynamic tag match circuit as set forth in claim 1, wherein said force miss circuit comprises means for receiving at least one bit of said first address signal and for inhibiting generation of said force miss signal until said force miss circuit receives said at least one bit of said first address signal.

6. The dynamic tag match circuit as set forth in claim 1, wherein said force miss circuit comprises:
    a first MOSFET transistor having a first source, first drain, and first gate, said at least one force miss input signal being applied to said first gate and the first drain serving as the output of said force miss circuit, the output of said force miss circuit being precharged with a potential;
    a second MOSFET transistor having a second source, second drain, and second gate, said second source being connected to ground, said second gate receiving at least one bit of said first address signal, and said second drain being connected to said first source of said first MOSFET transistor; and
    a third MOSFET transistor having a third source, third drain, and third gate, said third source being connected to ground, said third gate receiving an inverted one bit of said first address signal, and said third drain being connected to said first source of said first MOSFET transistor;
    said force miss signal causing said first MOSFET transistor to conduct and said one bit of said first address signal causing one of either said second MOSFET transistor or said third MOSFET transistor to conduct;
    wherein the force miss input signal discharges the output of the force miss circuit to ground only upon receipt of said one bit and the inverted one bit of the first address signal.

7. The dynamic tag match circuit as set forth in claim 6, further comprising a fourth MOSFET transistor having a fourth drain, fourth gate, and fourth source, said fourth gate receiving a second force miss input signal, said fourth drain serving as the output of said force miss circuit, and said fourth source being connected to the first source of the first MOSFET transistor.

8. The dynamic tag match circuit as set forth in claim 1, further comprising a precharge circuit for precharging the output of the address compare circuit to a potential, said force miss circuit generating said force miss output signal by discharging said potential to ground through said force miss circuit and said address compare circuit generating said address miss signal by discharging said potential through a transistor.

9. The dynamic tag match circuit as set forth in claim 8, wherein said precharge circuit receives a clock signal and the output of the address compare circuit is connected to the output of the force miss circuit, said precharge circuit precharging the output of the address compare circuit to said potential when said clock signal is at a first logical level and said address compare circuit comparing said first address signal to said second address signal at a time while said clock signal is at a second logical level immediately following said first logical level.

* * * * *